US012606251B2

(12) United States Patent
Lee et al.

(10) Patent No.: US 12,606,251 B2
(45) Date of Patent: Apr. 21, 2026

(54) VEHICLE BODY REAR STRUCTURE

(71) Applicants: Hyundai Motor Company, Seoul (KR); Kia Corporation, Seoul (KR)

(72) Inventors: HaeHoon Lee, Seoul (KR); Jungho Lee, Suwon-si (KR); ChangHak Kang, Hwaseong-si (KR); Chan Woong Jeon, Incheon (KR); Sang Kyoung Han, Gunpo-si (KR); Youngrock Kim, Gwangmyeong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 339 days.

(21) Appl. No.: 18/459,812

(22) Filed: Sep. 1, 2023

(65) Prior Publication Data

US 2024/0199131 A1 Jun. 20, 2024

(30) Foreign Application Priority Data

Dec. 14, 2022 (KR) ........................ 10-2022-0174811

(51) Int. Cl.
*B62D 25/08* (2006.01)
*B60R 5/04* (2006.01)

(52) U.S. Cl.
CPC .............. *B62D 25/087* (2013.01); *B60R 5/04* (2013.01); *B62D 25/08* (2013.01)

(58) Field of Classification Search
None
See application file for complete search history.

(56) References Cited

U.S. PATENT DOCUMENTS

| | | | | | |
|---|---|---|---|---|---|
| 4,842,326 | A | * | 6/1989 | DiVito ...................... | B60P 3/42 |
| | | | | | 296/10 |
| 4,887,859 | A | * | 12/1989 | Aper .................... | B62D 47/006 |
| | | | | | 296/193.03 |
| 4,968,087 | A | * | 11/1990 | Goria ..................... | B62D 65/04 |
| | | | | | 296/29 |
| 6,102,470 | A | * | 8/2000 | Heim ................... | B62D 25/087 |
| | | | | | 293/133 |
| 8,585,130 | B2 | * | 11/2013 | Gonin .................. | B62D 21/152 |
| | | | | | 296/187.11 |
| 8,727,426 | B2 | * | 5/2014 | Vitale .................... | B62D 21/14 |
| | | | | | 296/193.04 |
| 11,110,962 | B2 | * | 9/2021 | Choi ...................... | B62D 25/08 |
| 2007/0052261 | A1 | * | 3/2007 | Andre ................... | B62D 65/04 |
| | | | | | 296/193.04 |
| 2008/0169665 | A1 | * | 7/2008 | Hedderly ............. | B62D 29/008 |
| | | | | | 296/29 |

FOREIGN PATENT DOCUMENTS

| | | | | | |
|---|---|---|---|---|---|
| EP | 3730389 | A1 | * | 10/2020 | ............. B62D 25/04 |
| JP | 2007269087 | | * | 10/2007 | |

\* cited by examiner

*Primary Examiner* — Joseph D. Pape
(74) *Attorney, Agent, or Firm* — Slater Matsil, LLP

(57) ABSTRACT

An embodiment rear structure of a vehicle body includes a rear opening having a first closed shape surrounding a rear of an upper body and mounted on the rear of the upper body, a rear end module having a second closed shape surrounding the rear opening and connected in a length direction of the vehicle body, and a rear cross member mounted on a lower part of a connection portion of the rear opening and the rear end module.

20 Claims, 11 Drawing Sheets

VEHICLE BODY REAR STRUCTURE

CROSS-REFERENCE TO RELATED APPLICATIONS

This application claims the benefit of Korean Patent Application No. 10-2022-0174811, filed on Dec. 14, 2022, which application is hereby incorporated herein by reference.

TECHNICAL FIELD

The present invention relates to a vehicle body rear structure.

BACKGROUND

In general, in order to secure the strength and crash performance of the entire vehicle, the rear side member at the rear of the vehicle body and the rear back beam are directly connected.

A typical rear side member and rear back beam are connected by bolting, but the rear back beam may not be directly connected to the vehicle body.

That is, the connection between the upper body at the rear of the vehicle body and the rear back beam or rear side member is disconnected, limiting the improvement of NVH performance of the vehicle, and dispersing the collision load during a vehicle collision may not be effective.

The above information disclosed in this background section is only for enhancement of understanding of the background of embodiments of the invention, and therefore it may contain information that does not form the prior art that is already known to a person of ordinary skill in the art.

SUMMARY

The present invention relates to a vehicle body rear structure. Particular embodiments relate to a vehicle body rear structure that enhances the connectivity of the rear of the vehicle body.

Embodiments of the present disclosure provide a vehicle body rear structure with enhanced connectivity of the rear of the vehicle body.

A vehicle body rear structure according to an exemplary embodiment may include a rear opening having a closed shape surrounding a rear of an upper body and mounted on the rear of the upper body, a rear end module of a closed shape that surrounds the rear opening and is connected in the length direction of the vehicle body, and a rear cross member mounted on the lower part of a connection portion of the rear opening and the rear end module.

The vehicle body rear structure according to an exemplary embodiment may further include a rear engage portion integrally connecting the rear opening, the rear end module, and the rear cross member.

The vehicle body rear structure according to an exemplary embodiment may further include a rear side member disposed under the upper body in the length direction of the vehicle body, wherein the rear engage portion may integrally connect the rear opening, the rear end module, and the rear cross member.

The rear opening may include an opening lower horizontal plane on which a rear opening connection hole is formed and which is formed to protrude to the rear of the vehicle body, the rear cross member may include a cross lower horizontal plane on which a cross member connection hole is formed and which is formed to protrude to the rear of the vehicle body, the rear end module may include a connection protrusion formed in the height direction of the vehicle body, a rear side connection hole may be formed in the rear side member, and the rear engage portion may pass through the rear side connection hole, the rear opening connection hole, and the cross member connection hole to be engaged to the connection protrusion.

The rear end module may further include a rear end module connection portion rib formed to an upper portion of the connection protrusion in a rearward direction of the vehicle body along a width direction of the vehicle body.

The rear end module may further include a rear end module lower protrusion, which is protruded in the rear direction of the vehicle body on the upper portion of the rear end module connection portion rib, and a rear end module lower rib formed along the width direction of the vehicle body on the rear end module lower protrusion in the forward direction of the vehicle body.

The rear end module may further include a rear end module middle protrusion formed on the upper portion of the rear end module lower protrusion in the forward direction of the vehicle body and a rear end module middle rib formed along the width direction of the vehicle body on the rear end module middle protrusion in the rear direction of the vehicle body.

The rear end module may further include a rear end module upper protrusion, which is protruded in the rear direction of the vehicle body on the upper portion of the rear end module middle protrusion, and a rear end module upper rib formed along the width direction of the vehicle body on the rear end module upper protrusion in the forward direction of the vehicle body.

The rear end module upper rib may support the upper portion of the rear cross member.

The rear cross member may include a rear cross member rear protrusion extended from the cross lower horizontal plane, protruded in the rear direction of the vehicle body, and supported by the rear end module lower rib and the rear end module middle protrusion.

The rear opening may further include a rear opening front protrusion that extends from the opening lower horizontal plane and is protruded in the forward direction of the vehicle body to form a rear cross closed cross-section in the width direction of the vehicle body together with the rear cross member rear protrusion.

The rear cross member may further include a rear cross member upper extension extending upward from the rear cross member rear protrusion with a shape corresponding to the rear end module middle protrusion, and the rear opening may further include a rear opening upper extension extending upward from the rear opening front protrusion to form a rear cross upper closed cross-section together with the rear cross member upper extension.

The rear cross member may include a rear cross member rear protrusion extended from the cross lower horizontal plane and protruded in the rear direction of the vehicle body.

The rear opening may further include a rear opening front protrusion that extends from the opening lower horizontal plane and is protruded in the forward direction of the vehicle body to form a rear cross closed cross-section in the width direction of the vehicle body together with the rear cross member rear protrusion.

The vehicle body rear structure according to an exemplary embodiment may further include a chassis frame mounted on the lower part of the upper body, and the chassis frame may further include a chassis frame side member disposed on both sides of the vehicle body in the length direction and connected with the upper body and a rear back beam coupled to a rear end of the chassis frame side member.

The chassis frame may further include a frame mounting bracket connected to the chassis frame side member, the rear opening may include a rear opening lower mounting portion formed at a position corresponding to the frame mounting bracket, the rear cross member may include a rear cross member lower mounting portion forming a rear mounting bracket together with the rear opening lower mounting portion, and the frame mounting bracket, the rear opening lower mounting portion, and the rear cross member lower mounting portion may be integrally connected through a chassis frame engage portion.

The vehicle body rear structure according to an exemplary embodiment may improve the NVH performance of the vehicle by reinforcing the connectivity of the rear parts of the vehicle body and may effectively distribute the crash load during a vehicle collision.

In addition, the effects that can be obtained or predicted due to the embodiments of the present invention will be directly or implicitly disclosed in the detailed description of the embodiments of the present invention. That is, various effects expected according to embodiments of the present invention will be disclosed within the detailed description to be described later.

BRIEF DESCRIPTION OF THE DRAWINGS

Since these drawings are for reference in explaining exemplary embodiments of the present invention, the technical idea of embodiments of the present invention should not be construed as limited to the accompanying drawings.

DETAILED DESCRIPTION OF ILLUSTRATIVE EMBODIMENTS

Figure 1:
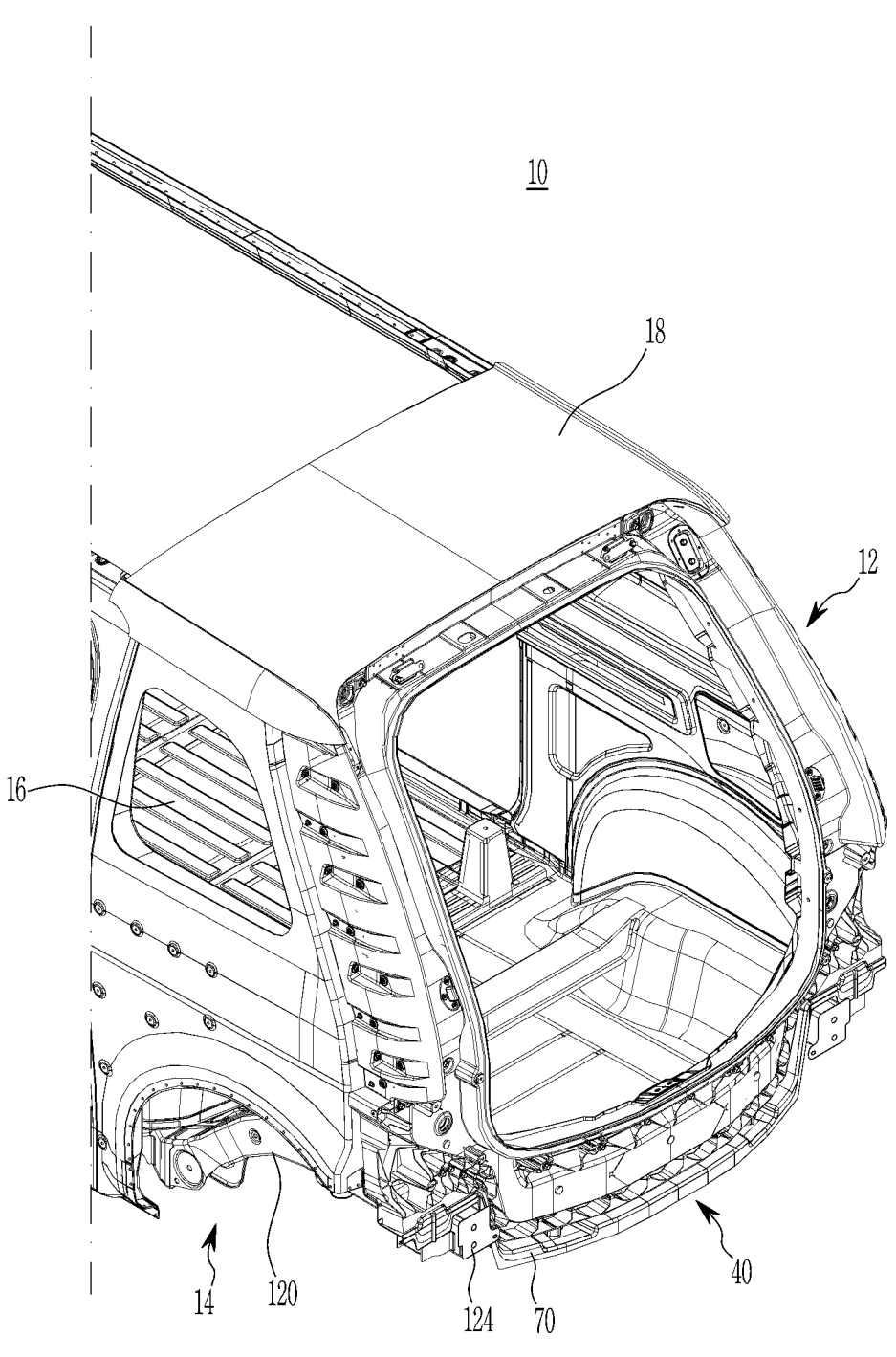
FIG. 1 is a perspective view of a vehicle body rear structure according to an exemplary embodiment.

Hereinafter, with reference to the accompanying drawings, embodiments of the present invention will be described in detail so that those skilled in the art can easily carry out embodiments of the present invention. As those skilled in the art would realize, the described embodiments may be modified in various different ways, all without departing from the spirit or scope of the embodiments of the present invention.

In order to clearly describe embodiments of the present invention, parts irrelevant to the description are omitted, and the same reference numerals are assigned to the same or similar components throughout the specification.

Since the size and thickness of each component shown in the drawings are arbitrarily shown for convenience of explanation, embodiments of the present invention are not necessarily limited to those shown in the drawings, and the thickness is enlarged to clearly express various parts and regions.

Throughout the specification, when a part includes a certain component, this means that it may further include other components without excluding other components unless otherwise stated.

In addition, terms such as "part" and "means" described in the specification mean a comprehensive unit of configuration that performs at least one function or operation.

When a part such as a layer, film, region, plate, etc. is said to be "on" another part, this includes not only the case of being directly on the other part, but also the case where there is another part in between.

In contrast, when an element is referred to as being "directly on" another element, there are no intervening elements present.

Exemplary embodiments will hereinafter be described in detail with reference to the accompanying drawings.

Figure 2:
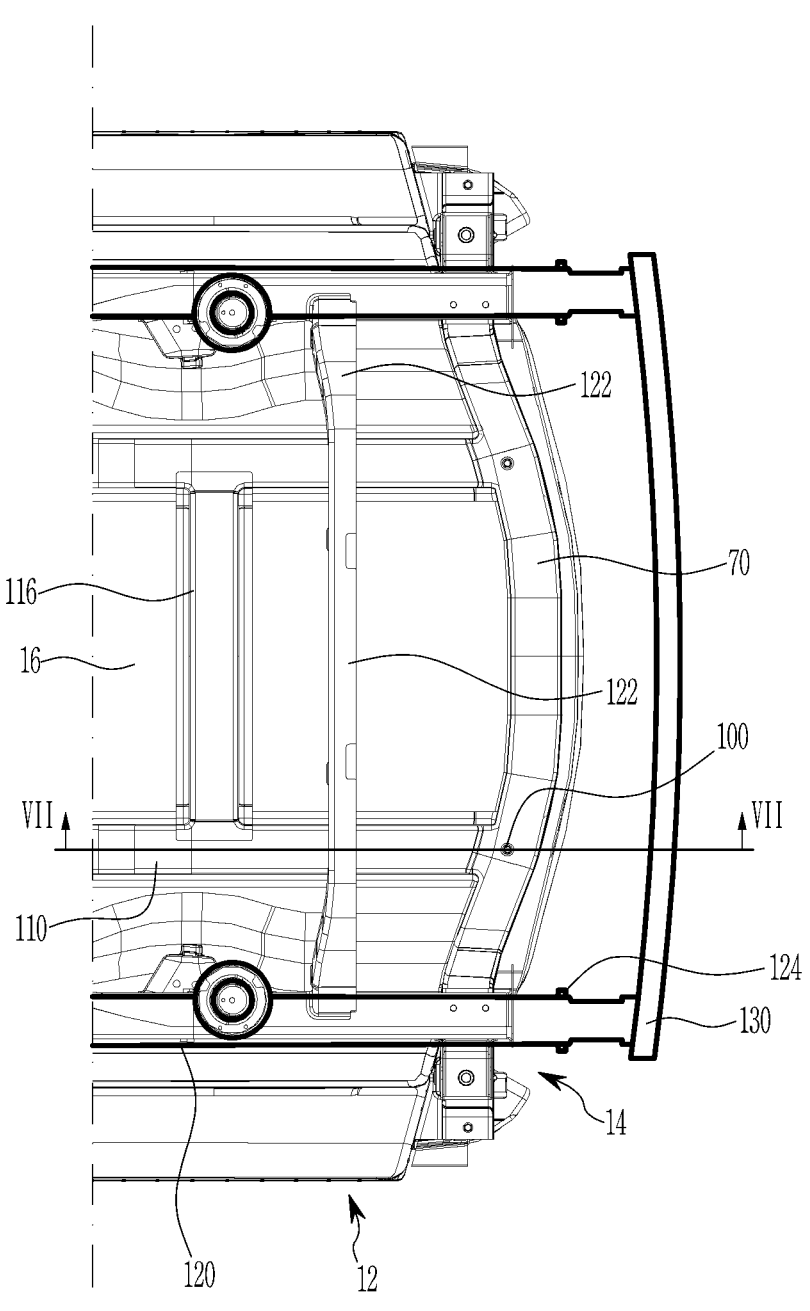
FIG. 2 is a bottom view of a vehicle body rear structure according to an exemplary embodiment.

FIG. 1 is a perspective view of a vehicle body rear structure according to an exemplary embodiment, and FIG. 2 is a bottom view of a vehicle body rear structure according to an exemplary embodiment.

Figure 3:
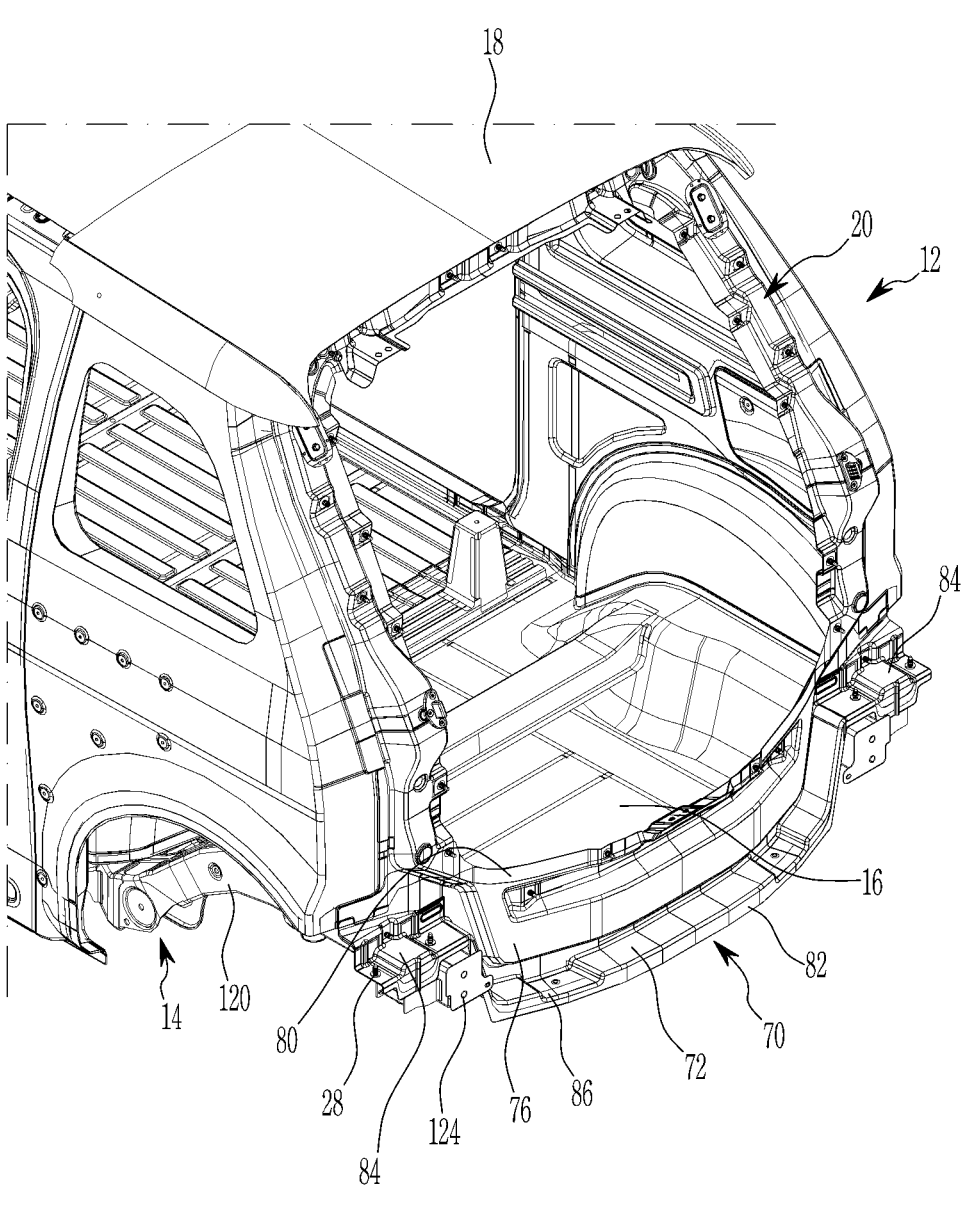
FIG. 3 is a drawing excluding a rear end module in FIG. 1.
Figure 4:
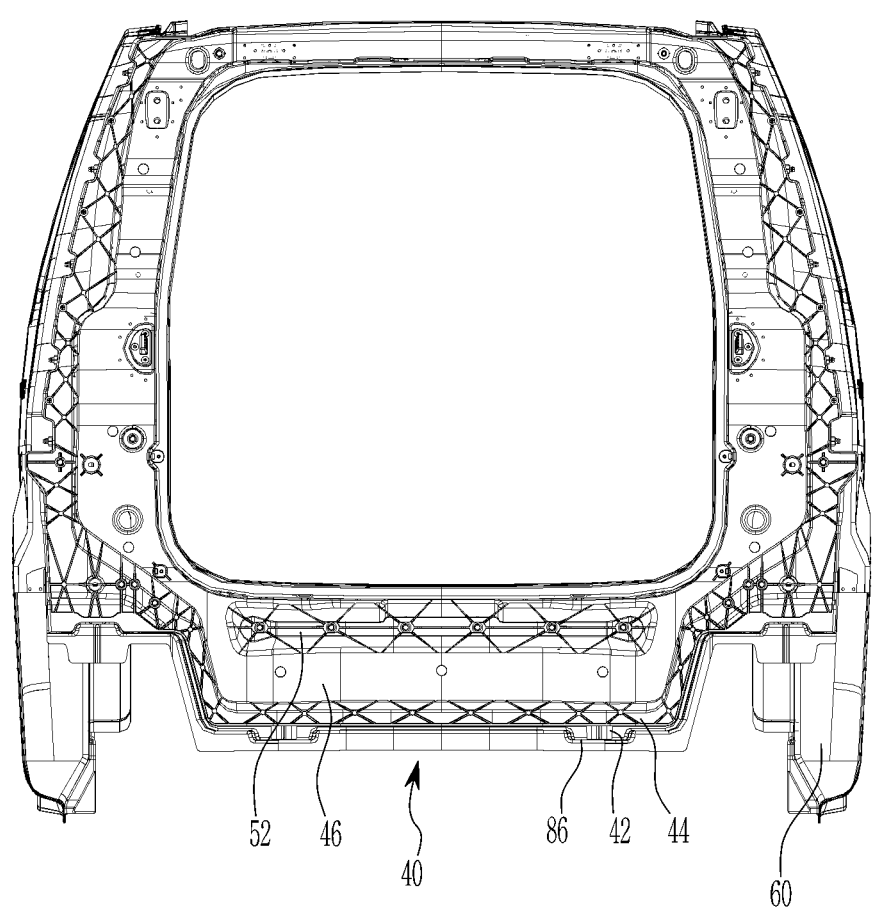
FIG. 4 is a front view of a rear end module of the vehicle body rear structure according to an exemplary embodiment.

FIG. 3 is a drawing excluding a rear end module in FIG. 1, and FIG. 4 is a front view of a rear end module of the vehicle body rear structure according to an exemplary embodiment.

Referring to FIG. 1 to FIG. 4, a vehicle body 10 to which the vehicle body rear structure according to an exemplary embodiment may be applied may include an upper body 12 and a chassis frame 14, and a roof 18 may be mounted on the upper portion of the vehicle body 10.

The chassis frame 14 is disposed on both sides of the vehicle body 10 in the length direction and further includes a chassis frame side member 120 coupled to the upper body 12 and a rear back beam 130 coupled to a rear end of the chassis frame side member 120.

A chassis frame side member end bracket 124 is mounted on one end of the chassis frame side member 120, and the rear back beam 130 is connected to the chassis frame side member 120 through the chassis frame side member end bracket 124.

The chassis frame side member 120 disposed on both sides of the vehicle body 10 may be connected through a chassis frame connection member 122.

The rear back beam 130 may bear a crash load in the event of a rear crash and distribute the crash load through the chassis frame side member 120. In addition, the rear back beam 130 may secure a width direction cross-section coefficient of the vehicle body 10.

However, in a general vehicle body rear structure, the efficiency of vehicle body strength may not be maximized because the connection between the rear back beam and the upper body is limited.

The vehicle body rear structure according to an exemplary embodiment may include a rear opening 20 having a closed shape surrounding the rear of the upper body 12.

The rear opening 20 connects a roof rail 32 disposed on the upper portion of the vehicle body 10, a quarter complement 34 disposed on both sides of the vehicle body 10 and connected to the roof rail 32, and a back panel 36 connecting lower portions of the quarter complement 34 on both sides.

The roof rail 32, the quarter complement 34, and the back panel 36 are connected to form the closed shape rear opening 20.

In the detailed description and claims, the closed shape means a structure in which each component is not disconnected but connected, the strength is increased by the connection relationship of each component, and the impact load is easily distributed.

The vehicle body rear structure according to an exemplary embodiment may include a rear end module 40 of a closed shape that surrounds the rear opening 20 and is connected in the length direction of the vehicle body 10 and a rear cross member 70 mounted on the lower part of a connection portion of the rear opening 20 and the rear end module 40.

The rear opening 20 may be a configuration of metal material parts, and the rear end module 40 may be a plastic material and may be an integrally formed closed shape. The combination of the rear opening 20 of closed shape and the rear end module 40 of closed shape may improve the strength and connectivity of the rear of the vehicle body.

In addition, the rear cross member 70 is a metal material that increases width direction strength of the vehicle body 10 and is mounted between the rear opening 20 and the rear end module 40 to increase the strength of the rear of the vehicle body.

Figure 5:
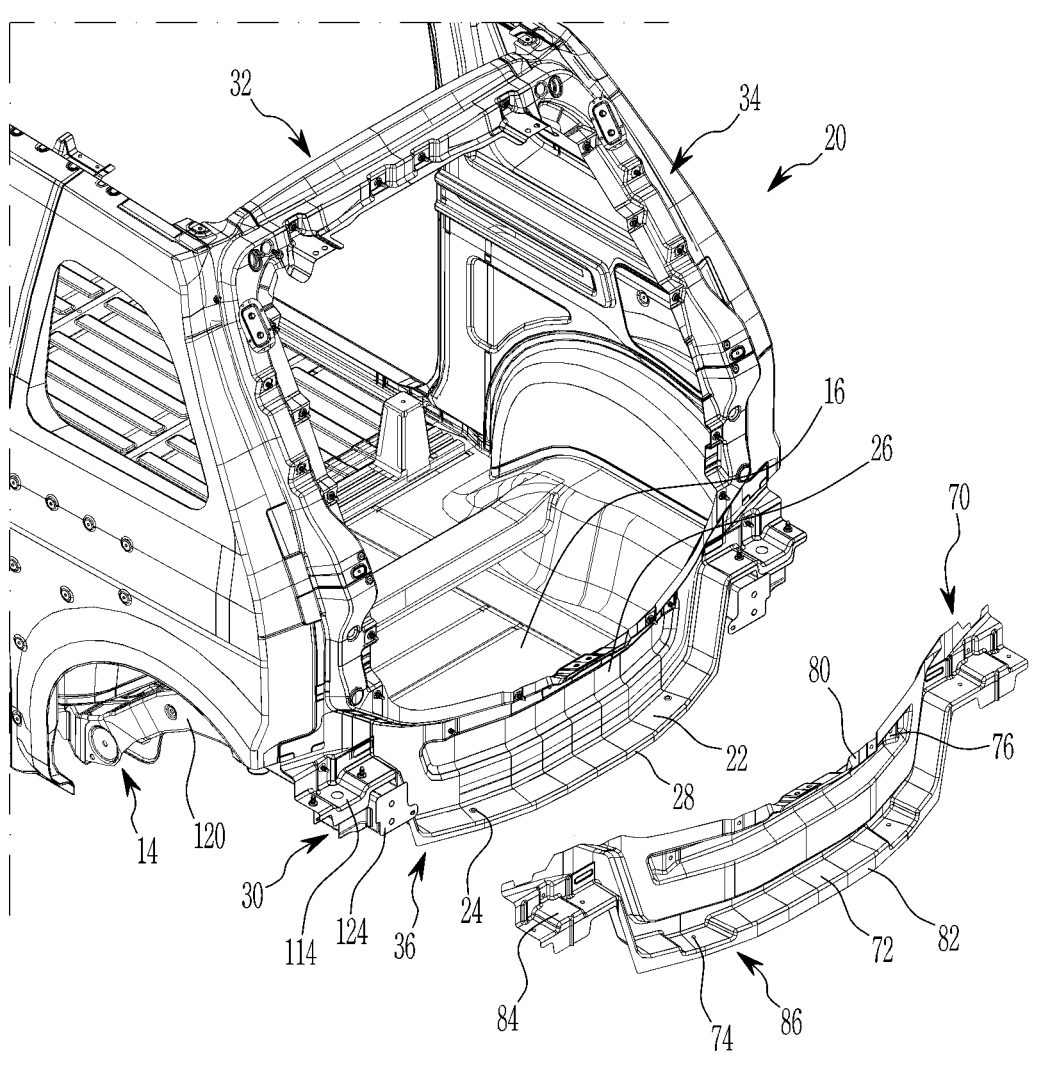
FIG. 5 and FIG. 6 are partially exploded perspective views of the vehicle body rear structure according to an exemplary embodiment.
Figure 6:
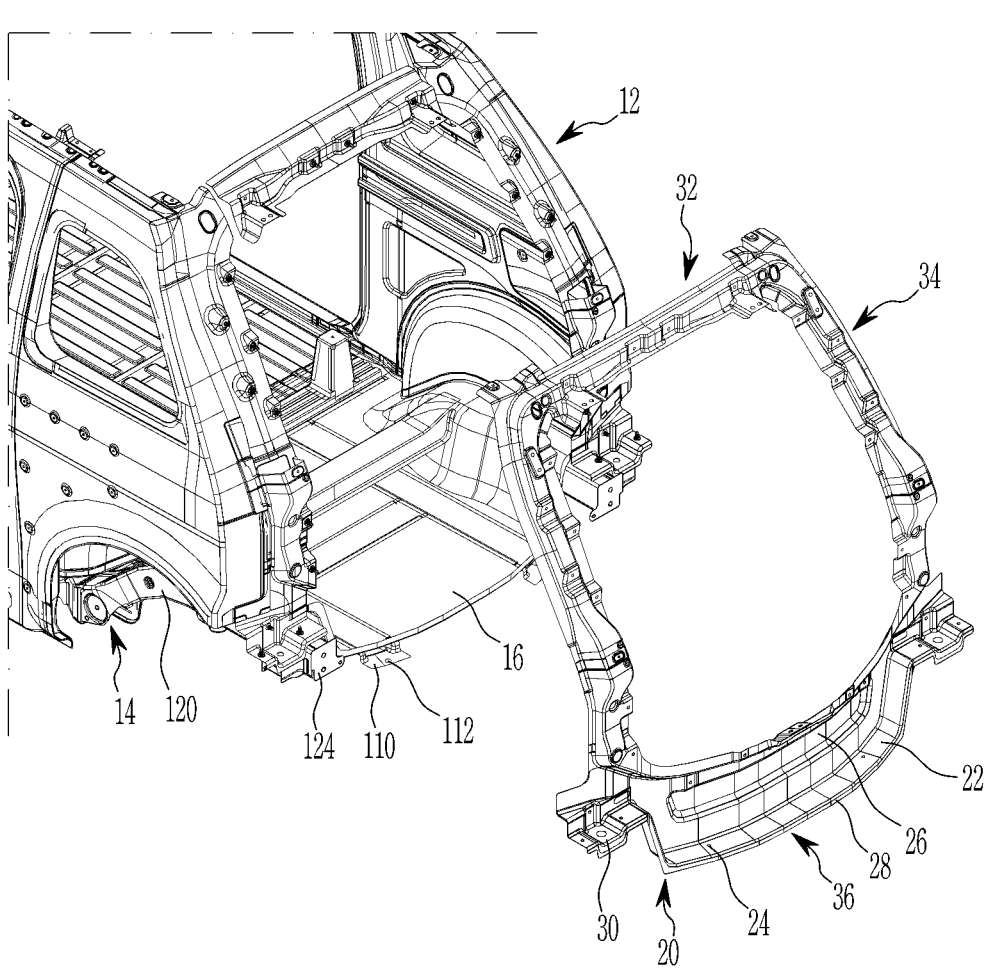

FIG. 5 and FIG. 6 are partially exploded perspective views of the vehicle body rear structure according to an exemplary embodiment.

Figure 7:
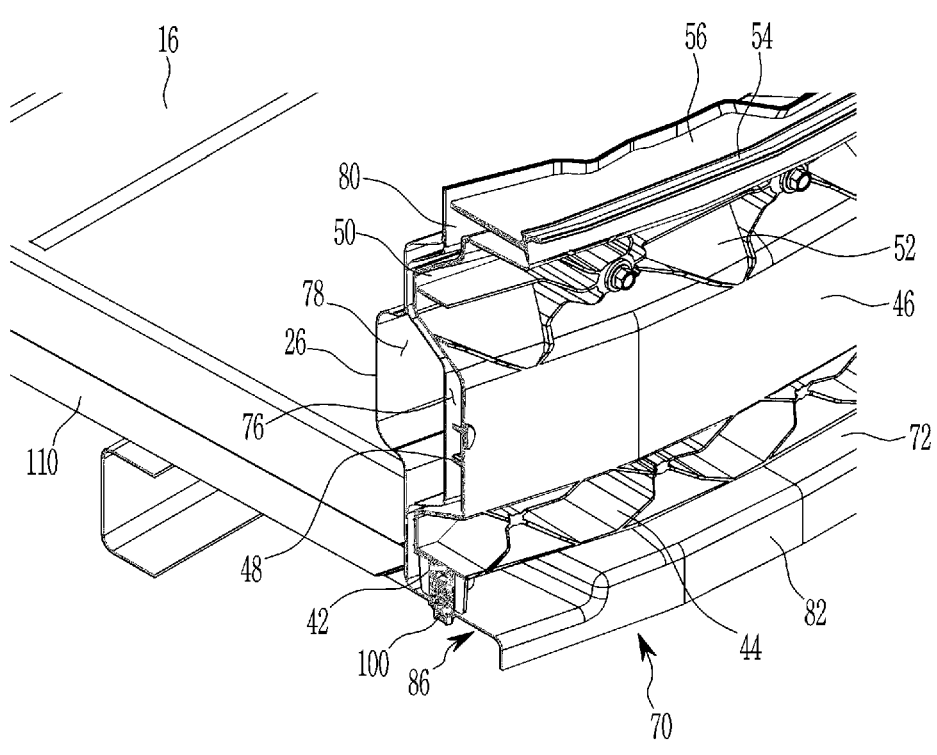
FIG. 7 is a cross-sectional perspective view along line VII-VII in FIG. 2.
Figure 8:
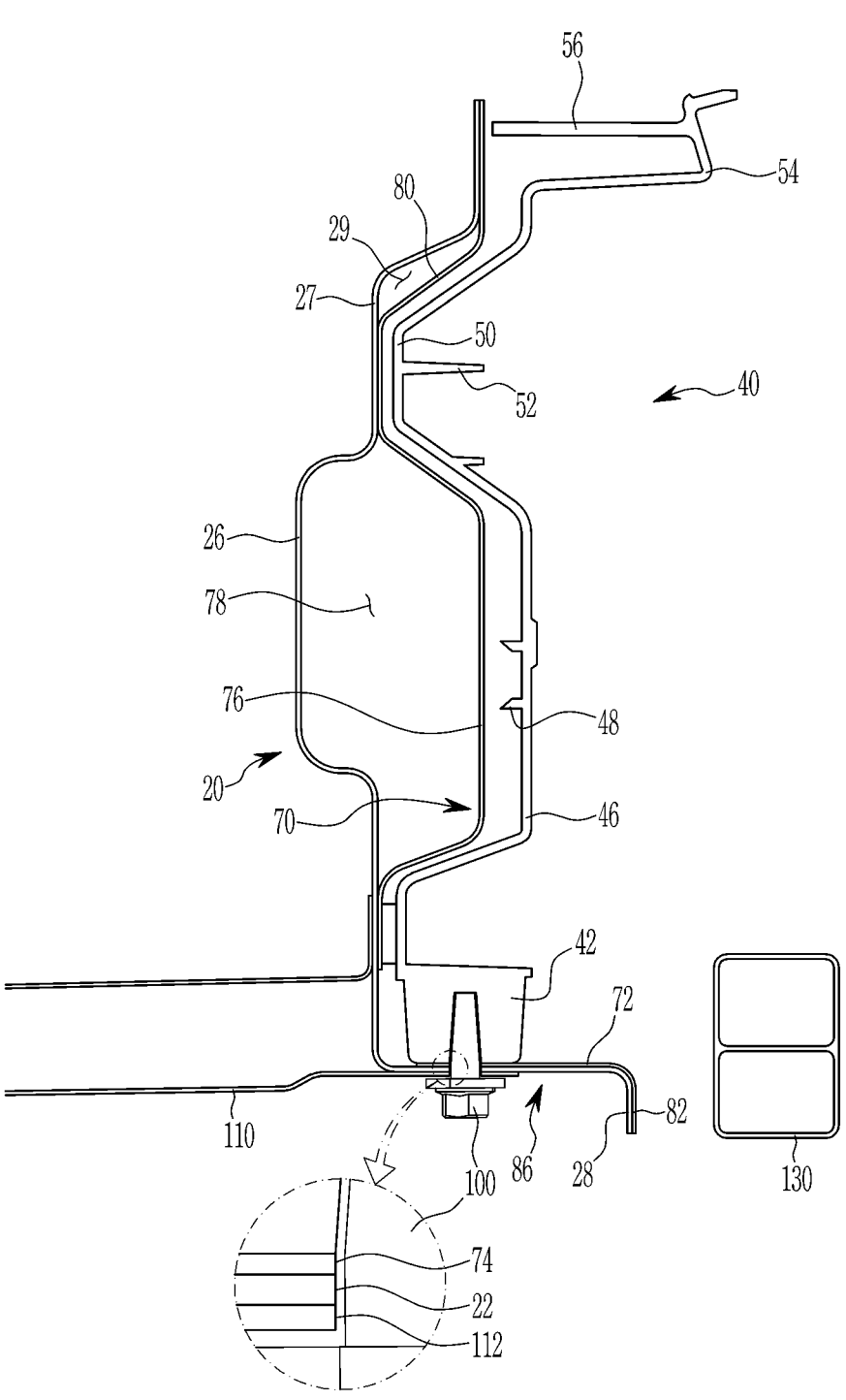
FIG. 8 is a cross-sectional view along line VII-VII in FIG. 2.

FIG. 7 is a cross-sectional perspective view along line VII-VII in FIG. 2, and FIG. 8 is a cross-sectional view along line VII-VII in FIG. 2.

The vehicle body rear structure according to an exemplary embodiment may further include a rear engage portion 100 integrally connecting the rear opening 20, the rear end module 40, and the rear cross member 70. The rear engage portion 100 may be, for example, an engage bolt, but it is not limited thereto.

The rear opening 20, the rear end module 40, and the rear cross member 70 are integrally connected to reinforce connectivity and increase the dispersion effect of impact load in the event of a rear collision of a vehicle.

Referring to FIG. 2, the vehicle body rear structure according to an exemplary embodiment may further include a rear side member 110 disposed under the upper body 12 in the length direction of the vehicle body 10.

The rear engage portion 100 may integrally connect the rear opening 20, the rear end module 40, the rear cross member 70, and the rear side member 110.

The rear opening 20, the rear end module 40, the rear cross member 70 and the rear side member no are integrally connected through the rear engage portion 100, so that when a vehicle collides, the collision load is effectively distributed and the vehicle strength is increased. Thus NVH performance may also be improved.

The rear side members no on both sides are connected through a rear side member connection body 116 and are mounted on the rear floor panel 16 to increase the width direction strength of the vehicle body 10.

The rear opening 20 includes an opening lower horizontal plane 22 on which a rear opening connection hole 24 is formed and which is formed to protrude to the rear of the vehicle body 10, and the rear cross member 70 includes a cross lower horizontal plane 72 on which a cross member connection hole 74 is formed and which is formed to protrude to the rear of the vehicle body 10.

The rear end module 40 includes a connection protrusion 42 formed in the height direction of the vehicle body 10 and a rear side connection hole 112 may be formed in the rear side member no.

The rear engage portion 100 may pass through the rear side connection hole 112, the rear opening connection hole 24, and the cross member connection hole 74 to be engaged to the connection protrusion 42.

The rear end module 40, referring to FIG. 5, may include a rear end module connection portion rib 44 formed to an upper portion of the connection protrusion 42 in a rearward direction of the vehicle body 10 along a width direction of the vehicle body 10. The rear end module connection portion rib 44 is formed around the connection protrusion 42 to reinforce the connection protrusion 42 and may absorb and disperse a crash load transmitted through the connection protrusion 42 when a vehicle collides.

The rear end module 40 may include a rear end module lower protrusion 46, which is protruded in the rear direction of the vehicle body 10 on the upper portion of the rear end module connection portion rib 44, and a rear end module lower rib 48 formed along the width direction of the vehicle body 10 on the rear end module lower protrusion 46 in the forward direction of the vehicle body 10.

The rear end module 40 may further include a rear end module middle protrusion 50 formed on the upper portion of the rear end module lower protrusion 46 in the forward direction of the vehicle body 10 and a rear end module middle rib 52 formed along the width direction of the vehicle body 10 on the rear end module middle protrusion 50 in the rear direction of the vehicle body 10.

The rear end module 40 may further include a rear end module upper protrusion 54, which is protruded in the rear direction of the vehicle body 10 on the upper portion of the rear end module middle protrusion 50, and a rear end module upper rib 56 formed along the width direction of the vehicle body 10 on the rear end module upper protrusion 54 in the forward direction of the vehicle body 10.

The curved shape of the rear end module lower protrusion 46, the rear end module middle protrusion 50, and the rear end module upper protrusion 54 increases the width direction cross-section coefficient of the rear of the vehicle body 10, and thus strength of the width direction may be increased.

In addition, the rear end module lower rib 48, the rear end module middle rib 52, and the rear end module upper rib 56 reinforce the strength of the rear end module lower protrusion 46, the rear end module middle protrusion 50, and the rear end module upper protrusion 54, respectively, and may increase the width direction strength of the vehicle body 10.

The rear end module upper rib 56 may support an upper portion of the rear cross member 70. The rear end module upper rib 56 may distribute a crash load through the rear cross member 70 in case of a rear collision of the vehicle.

The rear cross member 70 may include a rear cross member rear protrusion 76 extended from the cross lower horizontal plane 72, protruded in the rear direction of the vehicle body 10, and supported by the rear end module lower rib 48 and the rear end module middle protrusion 50.

The rear opening 20 may further include a rear opening front protrusion 26 that extends from the opening lower horizontal plane 22 and is protruded in the forward direction of the vehicle body 10 to form a rear cross closed cross-section 78 in the width direction of the vehicle body 10 together with the rear cross member rear protrusion 76.

The rear cross closed cross-section 78 may increase the width direction strength of the vehicle body 10 by increasing a width direction cross-section coefficient at the rear of the vehicle body 10.

The rear cross member 70 may further include a rear cross member upper extension 80 extending upward from the rear cross member rear protrusion 76 with a shape corresponding to the rear end module middle protrusion 50. And the rear opening 20, referring to FIG. 8, may further include a rear opening upper extension 27 extending upward from the rear opening front protrusion 26 to form a rear cross upper closed cross-section 29 together with the rear cross member upper extension 80.

The rear cross upper closed cross-section 29 and the rear cross closed cross-section 78 form a double cross-section in the width direction of the rear of the vehicle body 10 and increase the cross-section coefficient in the width direction of the vehicle body 10 so as to increase the width direction strength of the rear of the vehicle body 10.

Referring to FIG. 7 and FIG. 8, the rear cross member 70 may further include a rear cross member rear face 82 bent in the lower direction of the vehicle body 10 in the cross lower horizontal plane 72. The rear cross member rear face 82 is bent from the cross lower horizontal plane 72 to increase the width direction strength of the vehicle body 10.

Referring to FIG. 6, the rear opening 20 may further include a rear opening rear face 28 curved from the opening lower horizontal plane 22 in the lower direction of the vehicle body 10.

The rear opening rear face 28 may be bent from the opening lower horizontal plane 22 to increase the width direction strength of the vehicle body 10.

Figure 9:
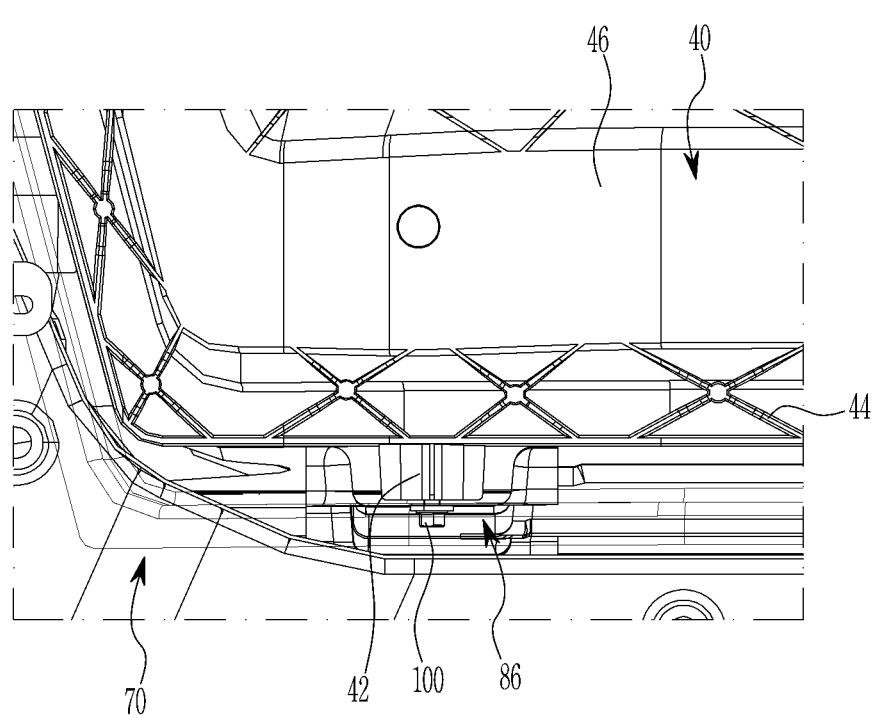
FIG. 9 is a drawing showing a rear connection configuration of the vehicle body rear structure according to an exemplary embodiment.

FIG. 9 is a drawing showing a rear connection configuration of the vehicle body rear structure according to an exemplary embodiment.

Referring to FIG. 7 and FIG. 9, a rear cross member recess portion 86 concave forward and downward of the vehicle body 10 to accommodate the connection protrusion 42 may be formed on the cross lower horizontal plane 72 of the rear cross member 70.

A lower surface of the rear cross member recess portion 86 supports the connection protrusion 42 to increase bonding strength.

Figure 10:
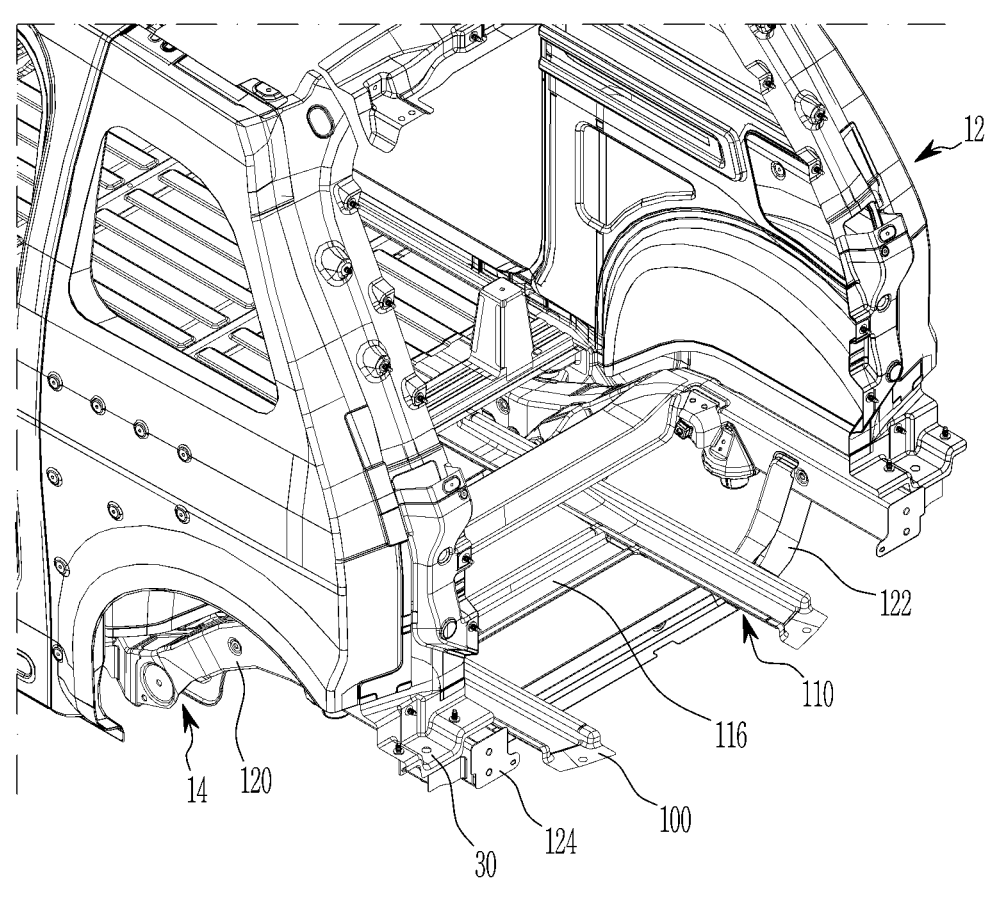
FIG. 10 is a partial perspective view of the vehicle body rear structure according to an exemplary embodiment.
Figure 11:
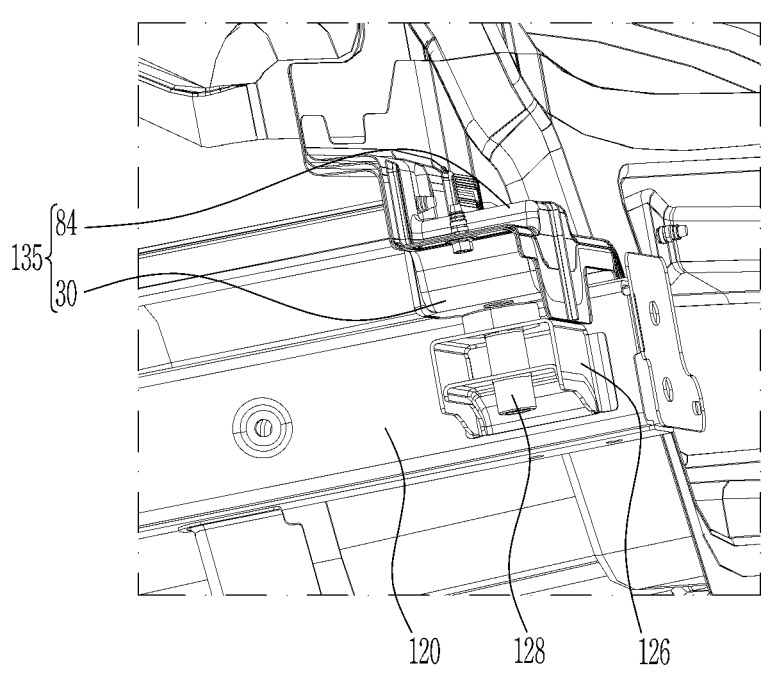
FIG. 11 is a drawing showing a connection of a chassis frame and an upper body of the vehicle body rear structure according to an exemplary embodiment.

FIG. 10 is a partial perspective view of the vehicle body rear structure according to an exemplary embodiment, and FIG. 11 is a drawing showing a connection of a chassis frame and an upper body of the vehicle body rear structure according to an exemplary embodiment.

Referring to FIG. 2, FIG. 3, FIG. 5, FIG. 10, and FIG. 11, the chassis frame 14 further includes a frame mounting bracket 126 connected to the chassis frame side member 120.

The rear opening 20 includes a rear opening lower mounting portion 30 formed at a position corresponding to the frame mounting bracket 126.

The rear cross member 70 includes a rear cross member lower mounting portion 84 forming a rear mounting bracket 135 together with the rear opening lower mounting portion 30.

The frame mounting bracket 126, the rear opening lower mounting portion 30, and the rear cross member lower mounting portion 84 may be integrally connected through a chassis frame engage portion 128. The chassis frame engage portion 128 may be a mounting bolt, but it is not limited thereto.

According to the vehicle body rear structure according to an exemplary embodiment, the structure may increase the rear strength of the vehicle body 10 by wrapping and combining the rear opening 20 of the closed shape with the rear end module 40 of the closed shape.

In addition, according to the vehicle body rear structure according to an exemplary embodiment, the rear cross member 70 is mounted between the rear opening 20 and the rear end module 40 to increase the rear strength of the vehicle body 10.

In addition, according to the vehicle body rear structure according to an exemplary embodiment, the rear opening 20, the rear end module 40, and the rear cross member 70 are integrally connected through the rear engage portion 100 to achieve rear connectivity of the vehicle body 10.

In addition, according to the vehicle body rear structure according to an exemplary embodiment, the rear engage portion 100 integrally connects the rear opening 20, the rear end module 40, the rear cross member 70, and the rear side member 110, and thus the rear strength of the vehicle body 10 may be increased.

In addition, the chassis frame side member 120 to which the rear back beam 130 is connected is integrally connected to the rear opening 20 and the rear cross member 70, so that the impact load is effectively dispersed during a rear collision of the vehicle.

While embodiments of the invention have been described in connection with what is presently considered to be practical exemplary embodiments, it is to be understood that the embodiments of the invention are not limited to the disclosed embodiments. On the contrary, they are intended to cover various modifications and equivalent arrangements included within the spirit and scope of the appended claims.

What is claimed is:

1. A rear structure of a vehicle body, the structure comprising:

a rear opening having a first closed shape surrounding a rear of an upper body and mounted on the rear of the upper body, wherein the rear opening comprises an opening lower horizontal plane protruding to a rear of the vehicle body and on which a rear opening connection hole is provided;

a rear end module having a second closed shape surrounding the rear opening and connected in a length direction of the vehicle body, wherein the rear end module comprises a connection protrusion disposed in a height direction of the vehicle body;

a rear cross member mounted on a lower part of a connection portion of the rear opening and the rear end module, wherein the rear cross member comprises a cross lower horizontal plane protruding to the rear of the vehicle body and on which a cross member connection hole is provided;

a rear side member disposed under the upper body in the length direction of the vehicle body, a rear side connection hole being provided in the rear side member; and a rear engage portion that passes through the rear side connection hole, the rear opening connection hole, and the cross member connection hole to be engaged to the connection protrusion.

2. The structure of claim 1, wherein the rear engage portion integrally connects the rear opening, the rear end module, and the rear cross member.

3. The structure of claim 1, wherein the rear end module further comprises a rear end module connection portion rib formed at an upper portion of the connection protrusion in a rearward direction of the vehicle body along a width direction of the vehicle body.

4. The structure of claim 3, wherein the rear end module further comprises:

a rear end module lower protrusion protruding in a rear direction of the vehicle body on an upper portion of the rear end module connection portion rib; and a rear end module lower rib disposed along the width direction of the vehicle body on the rear end module lower protrusion in a forward direction of the vehicle body.

5. The structure of claim 4, wherein the rear end module further comprises:

a rear end module middle protrusion disposed on an upper portion of the rear end module lower protrusion in the forward direction of the vehicle body; and a rear end module middle rib disposed along the width direction of the vehicle body on the rear end module middle protrusion in the rear direction of the vehicle body.

6. The structure of claim 5, wherein the rear end module further comprises:

a rear end module upper protrusion protruding in the rear direction of the vehicle body on an upper portion of the rear end module middle protrusion; and a rear end module upper rib disposed along the width direction of the vehicle body on the rear end module upper protrusion in the forward direction of the vehicle body.

7. The structure of claim 6, wherein the rear end module upper rib is configured to support the upper portion of the rear cross member.

8. The structure of claim 5, wherein the rear cross member comprises a rear cross member rear protrusion extended from the cross lower horizontal plane, protruded in the rear direction of the vehicle body, and configured to be supported by the rear end module lower rib and the rear end module middle protrusion.

9. The structure of claim 8, wherein the rear opening further comprises a rear opening front protrusion that extends from the opening lower horizontal plane and is protruded in the forward direction of the vehicle body to define a rear cross closed cross-section in the width direction of the vehicle body together with the rear cross member rear protrusion.

10. The structure of claim 9, wherein the rear cross member further comprises a rear cross member upper extension extending upward from the rear cross member rear protrusion with a shape corresponding to the rear end module middle protrusion.

11. The structure of claim 10, wherein the rear opening further comprises a rear opening upper extension extending upward from the rear opening front protrusion to define a rear cross upper closed cross-section together with the rear cross member upper extension.

12. The structure of claim 1, wherein the rear cross member comprises a rear cross member rear protrusion extended from the cross lower horizontal plane, and protruded in a rear direction of the vehicle body.

13. The structure of claim 12, wherein the rear opening further comprises a rear opening front protrusion that extends from the opening lower horizontal plane and is protruded in a forward direction of the vehicle body to define a rear cross closed cross-section in a width direction of the vehicle body together with the rear cross member rear protrusion.

14. A rear structure of a vehicle body, the structure comprising:

a rear opening having a first closed shape surrounding a rear of an upper body and mounted on the rear of the upper body;

a rear end module having a second closed shape surrounding the rear opening and connected in a length direction of the vehicle body;

a rear cross member mounted on a lower part of a connection portion of the rear opening and the rear end module;

a rear engage portion integrally connecting the rear opening, the rear end module, and the rear cross member;

a rear side member disposed under the upper body in the length direction of the vehicle body; and a chassis frame mounted on a lower part of the upper body, wherein the chassis frame comprises a chassis frame side member disposed on both sides of the vehicle body in the length direction and connected with the upper body and also comprises a frame mounting bracket connected to the chassis frame side member, wherein the rear opening comprises a rear opening lower mounting portion disposed at a position corresponding to the frame mounting bracket, wherein the rear cross member comprises a rear cross member lower mounting portion defining a rear mounting bracket together with the rear opening lower mounting portion, and wherein the frame mounting bracket, the rear opening lower mounting portion, and the rear cross member lower mounting portion are integrally connected through a chassis frame engage portion.

15. The structure of claim 14, wherein the chassis frame comprises:

a rear back beam coupled to a rear end of the chassis frame side member.

16. A vehicle comprising:

a vehicle body comprising an upper body and a chassis frame;

a roof mounted on an upper portion of the vehicle body;

a rear structure comprising a rear opening having a first closed shape surrounding a rear of the upper body and mounted on the rear of the upper body, wherein the rear opening comprises an opening lower horizontal plane protruding to a rear of the vehicle body and on which a rear opening connection hole is provided;

a rear end module having a second closed shape surrounding the rear opening and connected in a length direction of the vehicle body, wherein the rear end module comprises a connection protrusion disposed in a height direction of the vehicle body;

a rear cross member mounted on a lower part of a connection portion of the rear opening and the rear end module, wherein the rear cross member comprises a cross lower horizontal plane protruding to the rear of the vehicle body and on which a cross member connection hole is provided;

a rear engage portion integrally connecting the rear opening, the rear end module, and the rear cross member;

a rear side member disposed under the upper body in the length direction of the vehicle body, wherein the rear engage portion integrally connects the rear opening, the rear end module, and the rear cross member; and a rear side connection hole provided in the rear side member, wherein the rear engage portion passes through the rear side connection hole, the rear opening connection hole, and the cross member connection hole to be engaged to the connection protrusion.

17. The structure of claim 14, wherein the rear end module further comprises:

a rear end module connection portion rib formed at an upper portion of a connection protrusion in a rearward direction of the vehicle body along a width direction of the vehicle body;

a rear end module lower protrusion protruding in a rear direction of the vehicle body on an upper portion of the rear end module connection portion rib; and a rear end module lower rib disposed along the width direction of the vehicle body on the rear end module lower protrusion in a forward direction of the vehicle body.

18. The structure of claim 14, wherein the rear cross member comprises:

a rear cross member rear protrusion extended from a cross lower horizontal plane of the rear cross member and protruded in a rear direction of the vehicle body, and wherein the rear opening further comprises a rear opening front protrusion that extends from an opening lower horizontal plane of the rear opening and is protruded in a forward direction of the vehicle body to define a rear cross closed cross-section in a width direction of the vehicle body together with the rear cross member rear protrusion.

19. The vehicle of claim 16, wherein the rear end module further comprises:

a rear end module middle protrusion disposed on an upper portion of a rear end module lower protrusion in a forward direction of the vehicle body; and a rear end module middle rib disposed along a width direction of the vehicle body on the rear end module middle protrusion in a rear direction of the vehicle body.

20. The vehicle of claim 16, wherein the rear cross member comprises:

a rear cross member rear protrusion extended from the cross lower horizontal plane and protruded in a rear direction of the vehicle body, wherein the rear opening further comprises a rear opening front protrusion that extends from the opening lower horizontal plane and is protruded in a forward direction of the vehicle body to define a rear cross closed cross-section in a width direction of the vehicle body together with the rear cross member rear protrusion.

\* \* \* \* \*